Figure 1:
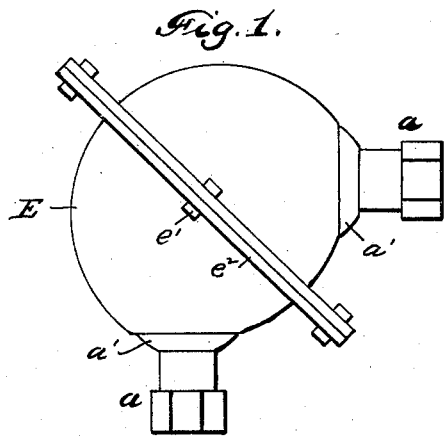

No. 685,876. Patented Nov. 5, 1901.
G. W. SHIELDS.
FLEXIBLE JOINT COUPLING.
(Application filed Feb. 28, 1901.)
(No Model.)

Witnesses:
D. Burdine
G. M. Copenhaver

Inventor:
Geo. W. Shields,
by H. N. Low atty.

THE NORRIS PETERS CO., PHOTO-LITHO., WASHINGTON, D. C.

UNITED STATES PATENT OFFICE.

GEORGE W. SHIELDS, OF LOUISVILLE, KENTUCKY, ASSIGNOR, BY MESNE ASSIGNMENTS, TO SHIELDS FLEXIBLE JOINTS COMPANY, A CORPORATION OF SOUTH DAKOTA.

FLEXIBLE-JOINT COUPLING.

SPECIFICATION forming part of Letters Patent No. 685,876, dated November 5, 1901.

Application filed February 28, 1901. Serial No. 49,338. (No model.)

*To all whom it may concern:*

Be it known that I, GEORGE W. SHIELDS, a citizen of the United States, residing at Louisville, in the county of Jefferson, State of Kentucky, have invented certain new and useful Improvements in Flexible-Joint Couplings; and I do declare the following to be a full, clear, and exact description of the invention, such as will enable others skilled in the art to which it appertains to make and use the same.

My invention relates to flexible-joint coupling, the flexibility being secured by the use of accurately-made hollow balls contained in an outer case, box, or ball and working in spherical bearings, close fitting to hold tight the liquid, gas, steam, or other fluid passing through the joint, each ball having apertures properly placed for the passage of the conducted fluids through it from the pipe or pipes through which such fluid enters to the pipe or pipes through which it leaves the joint, with one such ball attached to each entry-pipe and each exit-pipe, all of these balls being closely fitted to a spherical bearing in a like aperture into a hollow central key-ball used to hold the outer balls in position and to conduct the liquid from the entry ball or balls through the center ball to the exit ball or balls, all of these balls held in position on one side of the case or holder, which may be in the shape of a ball, box, or other suitable shape adapted to the number, arrangement, and position of the pipes, such case being made in two or more sections, the faces of the sections being fluid-tight and flanged and close fitted to each other and provided with suitable fastenings, such as bolts or rivets, passing through the flanges to hold the sections together and to firmly hold the balls in their bearings, the bolts being screw-threaded at each end for nuts to screw on or riveted or otherwise arranged so as to clasp the flanges of the sections securely and firmly together, each of which said holder or case and balls is of metal or glass or any suitable hard, strong, and durable material, and, if desired, each or any of said parts may be of different materials. The outer aperture of each outer ball is screw-threaded to receive and hold fast a pipe screw-threaded to correspond therewith, each aperture in the holder or case to be made enough larger in diameter than its pipe to permit such ball to be turned or moved in its bearings through such an angle or arc as required by the desired arrangement and directions of the several pipes and limited by the pipe coming in contact with the edge of the aperture, the outer holder or case being so adjusted and arranged in proportions, construction, size, and shape, bearings for the outer balls in the case and the center ball as to hold all firmly connected and liquid, gas, and steam tight, so that any liquid may pass freely through the entry pipe or pipes and the entry ball or balls and case into and through the center ball, the exit ball or balls and case, and into the exit pipe or pipes, the depth of the bearings in the center ball and the diameter of the bearings in the outer case being arranged larger or smaller according to the size of the ball and the space between the walls and the center ball and the angle or arc in which the pipe is to turn. The aperture in the wall of the case or outer holder must be enough smaller than the extreme circumference of the ball working in it to hold the ball in place, admitting, if desired, of turning the pipe in any direction through an arc of nearly one hundred and eighty degrees, less the arc covered by twice the diameter of the pipe, which flexible-joint ball-coupling, of metal, glass, or other hard and durable materials, will be practically indestructible, stronger, safer, more reliable, accurate, and durable, and less injured by heat or oils or other liquids, gas, or steam than elastic or flexible hose or pipes, less liable to get out of order or to be cut, bruised, torn or burst in use, and far less expensive or costly to use and operate than flexible pipe connections without interrupting the continuity of the flow of any liquid, gas, steam, or air through the pipes so connected by such coupling where desired; but this invention may be so used and applied as to effect, by such means as may be desired, a cut-off or stoppage of the flow through one or more of the entry or exit pipes, and the number of entry and exit pipes of such flexible joint will be not less than one of each and as many more of each, or either, as desired, and of such size or different sizes as desired, the number and size of such pipes being limited only by the following factors—viz., the respective and comparative sizes and distance from each other of the outer case or holder and the center ball or holder, the angles or arcs in which the respective pipes are to be worked, and the balls working in each, upon which the size of each aperture in the case or holder will depend, the possible number of such apertures being limited by the proportion of the space occupied by each to the whole space of such holder and the necessity of having such openings at such distance from each other as necessary to leave the pipes opportunity to move as desired without interference with each other, limited also by the proportion of the size of the spherical bearings in the key-ball necessary to hold each outer ball in place, as above described, to the whole available area of the key or center ball, and which one or more of the entry or exit balls is larger or smaller than another or others, the holding-space and bearings in the case and center or key balls can be made larger or smaller and deeper or shallower to fit the size and position of each outer ball, or by a protuberance or reënforcement on or an enlargement or extension of the center or key ball, or on the inside of the case or holder, the center or key ball or holder being stationary and fixed immovably with reference to the case and outer balls, which turn in its bearings and being either independent of or firmly attached to, as may be desired, the case or outer holder and held in fixed position with reference thereto by the pressure of the other balls against their several bearings in it and, if desirable, by as many firm supports, bolts, pipes, or blocks of metal or other suitable material arranged, placed, and attached to or part of the outer holder and center or key ball or inner holder in such manner as desired, and the inner holder key-ball may be of any other desired shapes or forms than spherical to hold the numbers and sizes of the balls which it is to hold, it being above referred to as the "inner" or "key" ball because in most such flexible couplings the outer balls would be of the same size, and in such cases, especially where the pipes are few in number, it would be easier and better to have both the outer case or holder and the inner or key ball or holder both hollow balls; but both holders can be of any form desired and adapted for any number and sizes of pipes and balls placed in any arrangement desired therefor and only limited as above indicated, and arranged and operated as indicated in the drawings and plans of such flexible-joint ball couplings or connections for a few different numbers of such pipes submitted with this application.

The object of my invention is to enable each of the metallic or other rigid pipes attached or connected to and with each other and used in transmitting gas, steam, vapor, or any liquid and joined and connected by such coupling or couplings to be turned, moved, or flexed with reference to each other by means of this patent coupling instead of it being necessary to use rubber, leather, or canvas or other flexible pipes, which are easily cut, injured, burst, or worn out, my said invention to be used to connect pipes conveying gases, air, steam, or any liquids in all places, and cars, vessels, vehicles, machines, machinery, factories, distilleries, breweries, refineries, and all other places where any liquid is conveyed through any rigid pipe or pipes and where, for any reason, it is necessary or desirable to have a flexible joint of like rigid material to be able to change at will in different directions the position of the pipes or parts of pipes carrying such fluid with reference to each other, as for movable joints in steam-pipes conveying steam or air for heating or braking purposes between the locomotive and cars of trains, or as in breweries, distilleries, tanneries, refineries, bottling-houses, ice-machines, or other places where it may be convenient or desirable to turn a rigid pipe to successive pipes, vats, tubs, casks, barrels, cases, measures, and other packages or receptacles on a level or different levels, angles, or positions, ways, uses, and applications.

The invention consists in the parts and combinations thereof hereinafter described and more particularly pointed out.

In order to enable the invention to be clearly understood, I have shown in the accompanying drawings means for carrying the same into practical effect without limiting my improvements in their useful applications to the particular constructions which, for the sake of illustration, I have delineated in said drawings.

Figure 2:
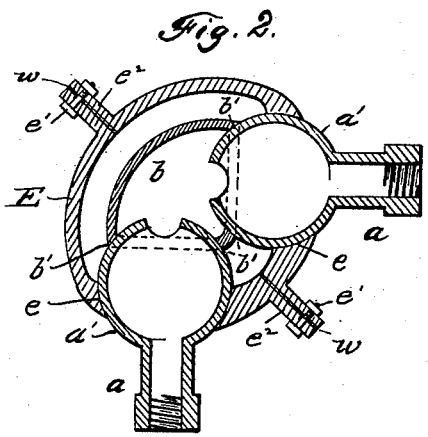
Figure 3:
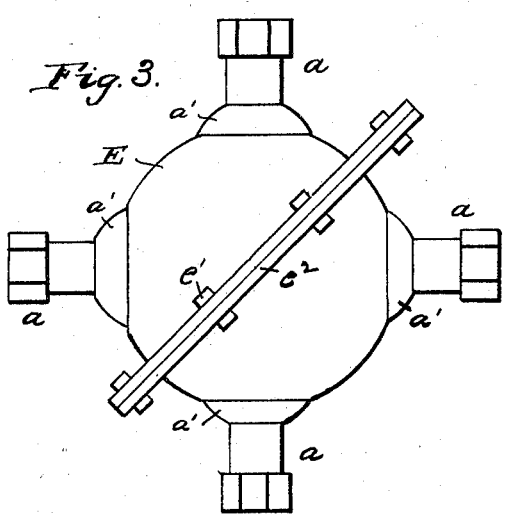
Figure 4:
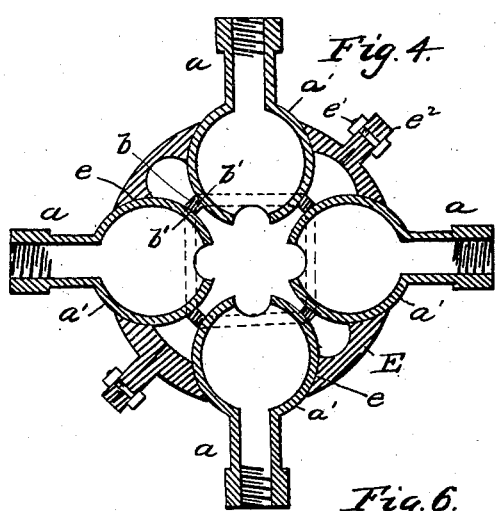
Figure 5:
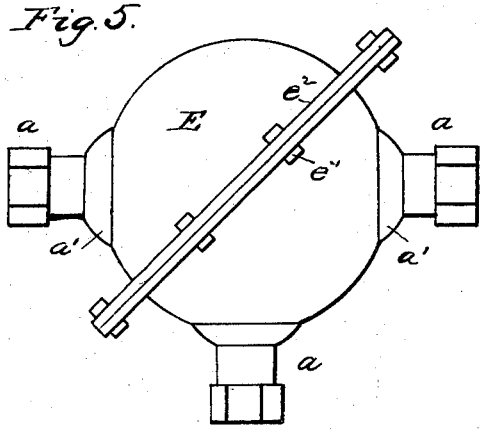
Figure 6:
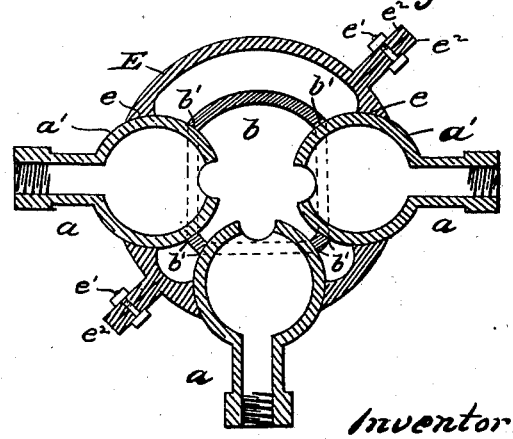

Figures 1 and 2 illustrate by elevation and section a form of my invention in which two pipe ends or connections are joined or connected together by such flexible-joint ball connection or elbow in such manner that both of such pipes are or may be free to be turned in any direction within the certain limits above indicated. Figs. 3 and 4 illustrate by elevation and section another form of the invention in which four of such pipe connections are joined or connected together, as above described. Figs. 5 and 6 show another form of the invention in which the said flexible joint connects three pipes.

It will be understood that my invention is not limited to the employment and connection of any particular number of pipes by said flexible-joint coupling; also that the forms and sizes and arrangement of the various members composing the above-described joint or coupling may be varied considerably without departing from my invention, and that any one or more but less than all of the pipes connected with this holder may, if desired, be inflexible and fixed or screwed directly in the center or key ball or holder passing through the case.

Referring to the drawings, *a* indicates the pipe connections or ends or pipes, one or more of which is or are movable relative to the other or others, and from one to the other of which there is a continuous fluid passage or conduit by means of the parts hereinafter described.

E is a hollow ball, box, or case and holder with apertures, which apertures are fitted with the spherical bearings above described, preferably in the form of a fluid, gas, air, and steam tight casing, which is provided with closely-fitting bearings. The ball on each of said pipes *a* fits closely and is managed and adapted to turn in any direction and to any extent within the above-indicated necessary limits of the apparatus. While said part E is adapted to prevent the pipes and balls A from any separation or movement away from each other, it also forces and holds said outer balls with the pipes so joined by each coupling fixed in their relative positions toward each other and toward the intermediate flexible-joint coupling piece, inner balls, or conduit as the parts are assembled. The bearing-surfaces of the part E are indicated at *e* and those of the pipes *a* at *a'*, these surfaces being preferably partispherical, as shown, and accurately fitted together to make a fluid, gas, steam, and air tight joint.

The bearing piece or case is made in two or more parts or sections adapted to be brought together to fit against the surfaces *a'* and is provided with suitable clamping means, such as bolts *e'*, passing through the flanges $e^2$ of said section. It will be understood that, if necessary or desirable, a washer or packing may be placed between the flanges $e^2$ in a well-known manner.

The intermediate joint-piece or conduit-section, called above "inner" or "key" ball *b*, is made hollow and so as to form a fluid-conductor from one or more to another or others of the pipes *a*, and its bearing-surfaces are indicated at *b'*, the same being made to accurately fit the surfaces *a'* of the balls with fluid, steam, gas, and air tight joints. So long as this object is accomplished and the pipe *a* left free to move, as hereinbefore described, the part *b* may be of various forms, as indicated in Figs. 2, 4, and 6. The part E may also be considerably varied in form and construction, three of such forms being indicated in the drawings herewith and the simplest form with the first application.

It will be observed that the bearing-piece E acts to hold the bearing-surfaces *a'* in contact with the bearing-surfaces *b'*, while the part *b* is or may be entirely free from contact with and independent of the exterior part E. The proper tightening of the bolts *e'* or other clamping means will bring all of the bearing-surfaces of the apparatus into proper contact with and relation to each other.

What I claim is—

1. In a flexible, angle pipe-joint the combination of two pipe ends or connections arranged at an angle to each other and having bearing-surfaces, a connecting means or casing partly inclosing said surfaces and having concave bearings for the same out of line with each other and engaging said surfaces, and an intermediate joint-piece and conduit-section having bearings out of line with each other and fitting said connections and acting to hold the latter apart and in engagement with said connecting means or casing.

2. In a flexible, angle pipe-joint the combination of two pipe ends or connections arranged at an angle to each other and having bearing surfaces or balls, one or more additional pipe ends or connections having bearing surfaces or balls, a connecting means or casing partly inclosing all of said balls and having concave bearings fitting the same, and an intermediate joint-piece and conduit-section having bearings fitting said balls and acting to hold the same apart in various directions and in engagement with said connecting means or casing.

3. In a flexible, angle pipe-joint the combination of a connecting means or casing having two pairs of oppositely-arranged concave bearings, two pairs of oppositely-arranged pipe ends or connections having bearing surfaces or balls held in said concave bearings, and an intermediate joint-piece or conduit-section having two pairs of bearings fitting said balls and holding the same apart and in engagement with said connecting means or casing.

In testimony whereof I affix my signature in the presence of two witnesses.

GEORGE W. SHIELDS.

Witnesses:
E. W. OPPENHEIMER,
AUGUSTUS E. WILLSON.